(12) United States Patent
Gainey et al.

(10) Patent No.: US 7,463,200 B2
(45) Date of Patent: Dec. 9, 2008

(54) DIRECTIONAL ANTENNA CONFIGURATION FOR TDD REPEATER

(75) Inventors: Kenneth M. Gainey, Satellite Beach, FL (US); James A. Proctor, Jr., Melbourne Beach, FL (US); Christopher A. Snyder, Melbourne, FL (US); James C. Otto, West Melbourne, FL (US)

(73) Assignee: QUALCOMM Incorporated, San Diego, CA (US)

(*) Notice: Subject to any disclaimer, the term of this patent is extended or adjusted under 35 U.S.C. 154(b) by 60 days.

(21) Appl. No.: 11/602,455

(22) Filed: Nov. 21, 2006

(65) Prior Publication Data

US 2007/0117514 A1 May 24, 2007

Related U.S. Application Data

(60) Provisional application No. 60/738,579, filed on Nov. 22, 2005.

(51) Int. Cl.
*H01Q 1/38* (2006.01)

(52) U.S. Cl. .............................. 343/700 MS; 343/725; 455/25; 455/63.4

(58) Field of Classification Search .......... 343/700 MS, 343/725, 727, 853; 455/25, 63.4, 269
See application file for complete search history.

(56) References Cited

U.S. PATENT DOCUMENTS 4,922,259 A * 5/1990 Hall et al. ............. 343/700 MS

| | | | |
|---|---|---|---|
| 6,195,051 B1 * | 2/2001 | McCoy et al. ......... 343/700 MS |
| 6,370,369 B1 | 4/2002 | Kraiem et al. |
| 6,549,567 B1 | 4/2003 | Fullerton |
| 6,781,544 B2 * | 8/2004 | Saliga et al. ........... 343/700 MS |
| 6,906,669 B2 * | 6/2005 | Sabet et al. ............ 343/700 MS |
| 7,132,988 B2 * | 11/2006 | Yegin et al. ................... 343/727 |
| 2004/0176050 A1 * | 9/2004 | Steer et al. ................... 455/101 |
| 2006/0098592 A1 | 5/2006 | Procter Jr., et al. |
| 2008/0057862 A1 * | 3/2008 | Smith ......................... 455/11.1 |

FOREIGN PATENT DOCUMENTS

WO 04062305 7/2004

OTHER PUBLICATIONS

International Search Report and Written Opinion of the International Searching Authority dated Nov. 2, 2007 in corresponding patent application No. PCT/US06/45123.

* cited by examiner

*Primary Examiner*—Tho G Phan
(74) *Attorney, Agent, or Firm*—Andrea L. Mays; Linda G. Gunderson; Thomas R. Rouse

(57) ABSTRACT

A wireless communication node, such as a repeater, including a frequency translating repeater, a physical layer (PHY) repeater, time divisional duplex repeater (TDD) and the like, is configured with a pair of directional patch antennae and an omni-directional antenna. The patch antennae can be selected depending on the orientation of the repeater package to communicate with a station such as an access point or a base station. The omni-directional antenna can be directed toward another station such as a client. The patch antennae and the omni-directional antenna can be orthogonally polarized to increase isolation and reduce electromagnetic coupling. Multiple antennae can be used in multiple-input-multiple-output (MIMO) configurations.

26 Claims, 15 Drawing Sheets

DIRECTIONAL ANTENNA CONFIGURATION FOR TDD REPEATER

CROSS REFERENCE TO RELATED APPLICATIONS

The present invention is related to and claims priority from U.S. Provisional Patent Application No. 60/738,579, filed Nov. 22, 2005 entitled "DIRECTIONAL ANTENNA CONFIGURATION FOR TDD REPEATER," the contents of which are incorporated herein by reference.

FIELD OF THE INVENTION

The present invention relates generally to wireless communication and more specifically to an antenna configuration associated with a wireless Time Division Duplex (TDD) repeater, the antenna configuration made up of closely packaged antennas having orthogonal polarization and isolation to reduce electromagnetic coupling and to provide high directivity.

BACKGROUND OF THE INVENTION

In a wireless communication node, such as a TDD repeater designed to operate with a TDD based wireless system capable of simultaneous transmission and reception of TDD packets, the orientation of the antenna units is crucial in establishing non-interfering operation as it is critical that the receiver is not desensitized by the transmitted signals. Further, enclosing antenna modules and repeater circuitry within the same package is desirable for convenience, manufacturing cost reduction and the like, but such packaging can give rise to interference problems.

In a full duplex repeater package for use in a TDD system, one antenna or set of antennae may operate with, for example, a base station, and another antenna operates with a subscriber. Since the frequency for the TDD repeater may be the same, or at least may be very close in frequency for both sides of the repeater, isolation becomes important particularly when simultaneous transmission and reception on both sides of the repeater are performed. Further, since the repeater unit houses all circuitry within a single package, it is desirable to closely position the antennae with minimal antenna-to-antenna interaction while maintaining acceptable gain and in many cases acceptable directivity. Directivity in antennae is desirable for use in links where the direction of the signal arrival will not vary, or at least will vary infrequently such as in a link from a repeater to a base station or Access Point (AP). Difficulties arise however, in that the use of antennae with high directivity requires that directional alignment with the base station or AP be performed, typically by trial-and-error manual alignment.

For ease of manufacture, an exemplary repeater should be configured such that it can be easily produced in high volume manufacturing operations using low cost packaging. The exemplary repeater should be simple to set up to facilitate easy customer operation. Additional problems arise however when packaging repeater antennae and circuitry in close proximity. First, it becomes difficult to achieve high isolation between antennae due solely to the close physical proximity even where directional antennae are used. Isolation becomes even more difficult where antennas having omni directional antenna patterns are used and where the proximity of the repeater to structures such as walls, furniture or other objects cannot be anticipated, and thus cannot be compensated for in advance due to unknown such as the final placement of the repeater module.

Simply put, as the antennae are placed closer together, the more likely the antennae will couple energy into each other, which reduces the isolation between the sides of the repeater. Maintaining an omni or semi-omni directional antenna pattern becomes difficult since overlapping radiation patterns of antennae which are placed close to each other tend to generate interference effects. Energy from the antennae can further be electrically coupled through circuit elements such as through a shared ground plane especially in configurations where multiple antennas are integrated and the ground plane is small. While the use of direction antenna can benefit the repeater in terms of increased range and reduced wireless signal variation due to Raleigh fading effects, directional antennas are not typically used for indoor applications, due to the requirement for directional alignment, which is beyond the capability or desire of the average user.

Some improvements can be obtained through cancellation or similar techniques where a version of a signal transmitted on one side of the repeater is used to remove the same signal if it appears on the other side of the repeater. Such cancellation however can be expensive in that additional circuitry is required, and can be computationally expensive in that such cancellation can result in the introduction of a delay factor in the repeater or alternatively can require the use of more expensive and faster processors to perform the cancellation function.

SUMMARY OF THE INVENTION

The present invention overcomes the above problems by providing an exemplary antenna array configuration in which two closely spaced patch antennae are combined with a dipole antenna such that one of the patch antennae can be selected depending on the orientation of the repeater package to communicate with a base station, AP, or the like, and the dipole antenna can be directed generally toward a client device such as a subscriber device, a user device, a wireless communication node, or the like. The patch antennae and the dipole antenna are orthogonally polarized to increase isolation and reduce electromagnetic coupling between the patch and dipole antennae. The antennae can be fed in a balanced configuration to reduce common mode currents. The use of multiple switched directional antennae allows for minimal user interaction during initial configuration and the repeater electronics may be utilized for automatic selection of the best directional antenna for use during initial configuration, and also periodically during operation.

The exemplary antenna configuration can include a monopole, a dipole, or another substantially omni-directional antenna element facing a client side of the repeater and two patch antennae facing the base station side of the repeater. The patch antennae are in parallel relation to each other and a substrate such as a ground plane located therebetween. The client side element can be arranged on the ground plane and, as noted, can be a monopole antenna, a dipole antenna, or the like. Either of the patch antennae can operate depending on which antenna has the best signal characteristics for communicating with a base station antenna. An isolation fence can be used between the patch antennae and the client side antenna arranged in perpendicular relation to the planes of the patch antennae and the main ground plane/circuit substrate.

It will be appreciated that placement of the repeater unit will have a large impact on determining the signal quality both toward the base station and between the repeater client or clients. Therefore, repeater performance can be analyzed and a user could be directed to reposition the repeater unit for optimum signal performance. In accordance with the present invention, the use of two or more switchable patch antennae can address the placement issue to an extent by allowing the system to select which of the patch antenna will provide the best reception toward the base station.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

DETAILED DESCRIPTION OF THE INVENTION

A directional antenna configuration is disclosed and described herein for a wireless communication node such as a TDD repeater. The exemplary antenna configuration can include a monopole, a dipole, or an alternative omni-directional or quasi omni-directional antenna element or configuration such as an "F" shaped antenna or the like, facing a client side of the repeater and two patch antennae facing the base station side of the repeater. The patch antennae are arranged in parallel relation to each other and in relation to a ground plane arranged therebetween and extending beyond the patch antennae on one side, such as the client side. The client side element can be arranged on the ground plane and, as noted, can be a monopole antenna, a dipole antenna, or the like. The patch antennae are both orthogonally polarized with respect to the client side antenna and are preferably vertically polarized, while the client side antenna is horizontally polarized. Either one of the two patch antenna can be switched into operation depending on which antenna has the best signal characteristics for communicating with a base station antenna.

Circuitry for the repeater can further be arranged on the ground plane between the patch antennae and thus can be configured for maximum noise rejection. For example, to reduce generalized coupling through the ground plane or repeater circuit board substrate, the antennae can be driven in a balanced fashion such that any portion of a signal coupling into the feed structure of another antenna will be common mode coupling for maximum cancellation. To further improve isolation and increase link efficiency, an isolation fence can be used between the patch antennae and the client side antenna. The isolation fence consists of, for example, a second ground plane or planar conductor portion arranged in perpendicular relation to the planes of the patch antennae and the main ground plane/circuit substrate.

It will be appreciated that placement of the repeater unit will have a large impact on determining the signal quality both toward the base station and toward the repeater client or clients. In some embodiments, a sounding signal can be used to analyze repeater performance. Based on the analysis, a user could be directed to reposition the repeater unit for optimum signal performance. In accordance with the present invention, the use of two switchable patch antennae can address the placement issue to an extent by allowing the system to select which of the patch antenna will provide the best reception toward the base station.

Figure 1:
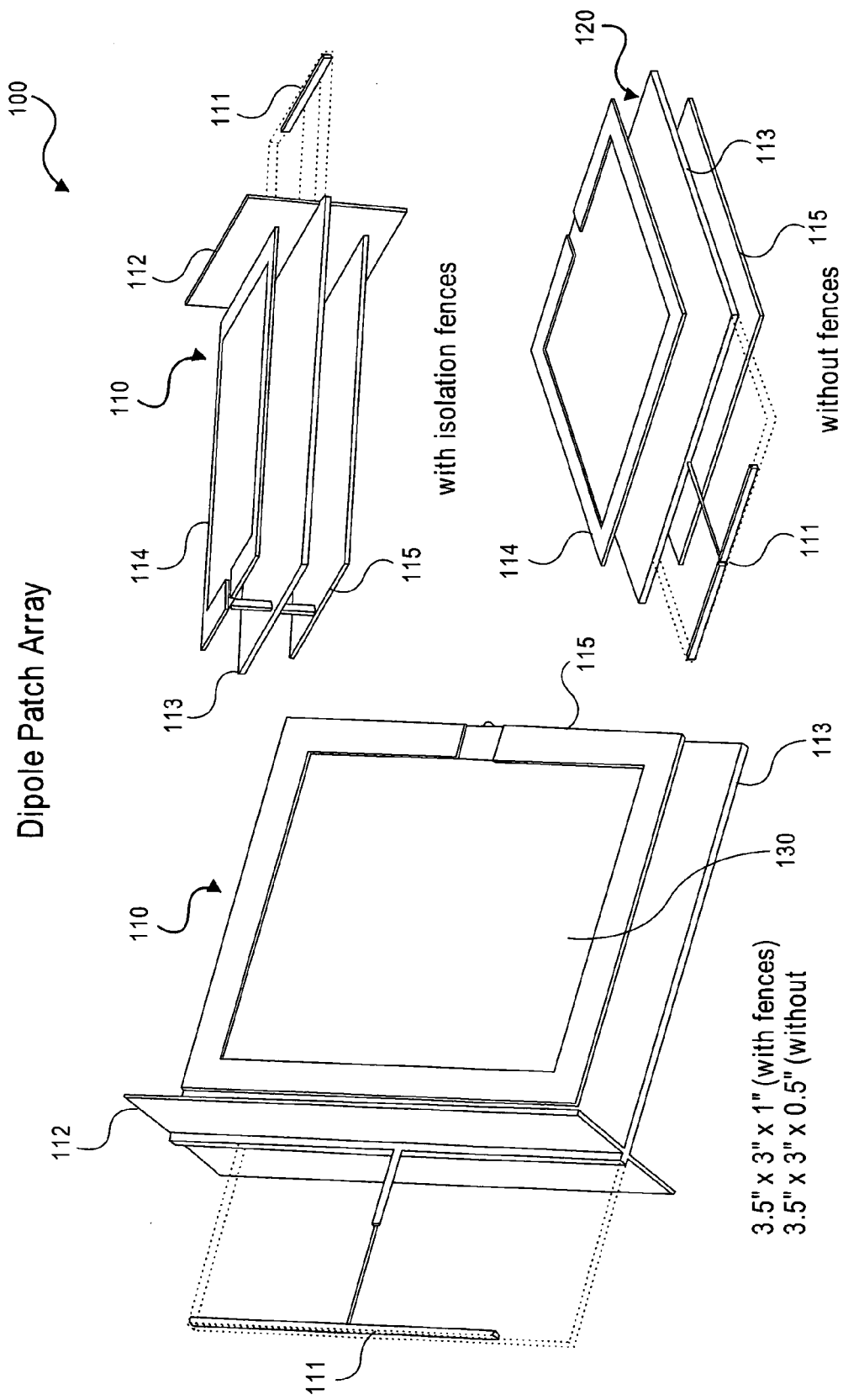
FIG. 1 is a diagram illustrating dipole array configurations in accordance with various exemplary embodiments.

As noted above, the exemplary repeater can be configured as a dipole patch array 100 as shown in FIG. 1. In arrangements 110 and 120, a pair of parallel patch antennae 114 and 115 can be arranged on either side of a ground plane 113, which can also be used as the circuit board for the repeater circuitry. Each of the patch antennae 114 and 115 are arranged in parallel with the ground plane 113 and can be printed on a printed circuit board (PCB), wiring board or the like, or can be constructed of a stamped metal portion embedded in a plastic housing. A planar portion of the PCB associated with the ground plane 113 can contain an antenna, such as a dipole antenna 111 configured, for example, as an embedded trace thereon and directed toward the client side of the repeater. It will be appreciated that the orientation of the patch antennae 114 and 115 are orthogonal with respect to the dipole antenna 111 and thus are orthogonally polarized leading to greater isolation and link efficiency. Typically, the patch antennae 114 and 115 are vertically polarized and the dipole antenna 111 is horizontally polarized.

As shown in arrangement 110, a conductive barrier, such as an isolation fence 112, can be used to provide an electromagnetic barrier between the physical regions of the patch antennae 114 and 115 and the dipole section 111 which are most likely to couple into each other. In arrangement 120, the isolation fence is not present. The isolation fence can be electrically coupled to the ground plane 113 to further enhance common mode noise rejection.

Figure 2:
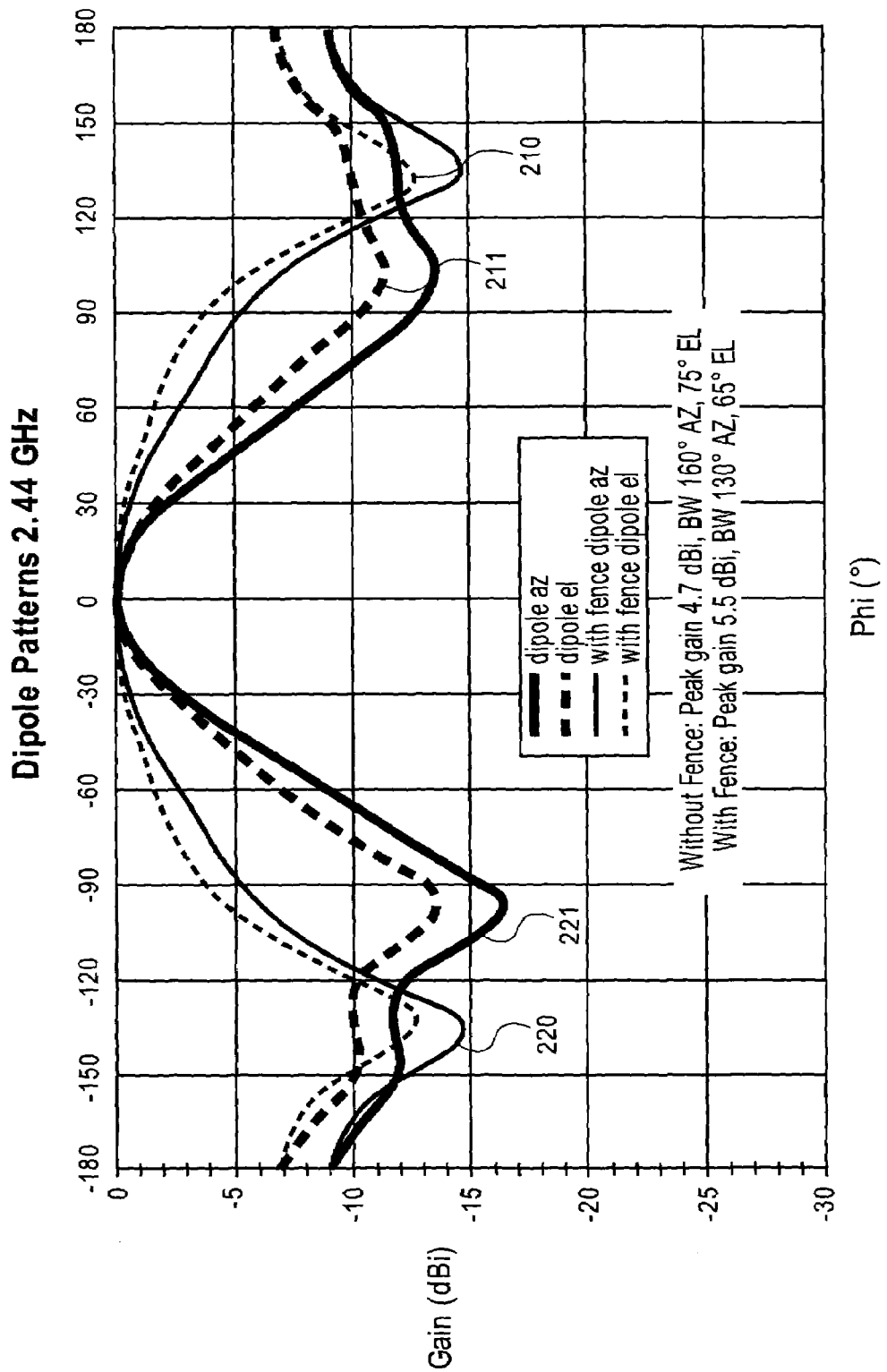
FIG. 2 is a graph illustrating the radiation patterns of a dipole portion of an exemplary dipole array configuration with and without an isolation fence in accordance with various exemplary embodiments.

The result of the use of the dipole patch array in various embodiments with a selected one of the patch antennae 114 and 115 and the dipole antenna 111 can be seen in FIG. 2, where a radiation plot shows the gain versus angle of azimuth and elevation are shown for the dipole antenna 111. In a trace 210, the gain vs. azimuth angle of the dipole antenna 111 is shown for an exemplary dipole patch array without the fence 112. Trace 211 shows the gain vs. elevation angle of the dipole antenna 111 without the fence 112. A peak gain of 4.7 dBi is realized with an azimuth of 160° and elevation of 75°. When the fence 112 is used, the improvement in peak gain and directivity can be seen. For example, a trace 220 shows the gain vs. azimuth angle of the dipole antenna 111 and a trace 221 shows the gain vs. elevation angle of the dipole antenna 111 with the fence 112. With the fence 112 in use, a peak gain of 5.5 dBi is realized with an azimuth of 130° and elevation of 65°.

Figure 3:
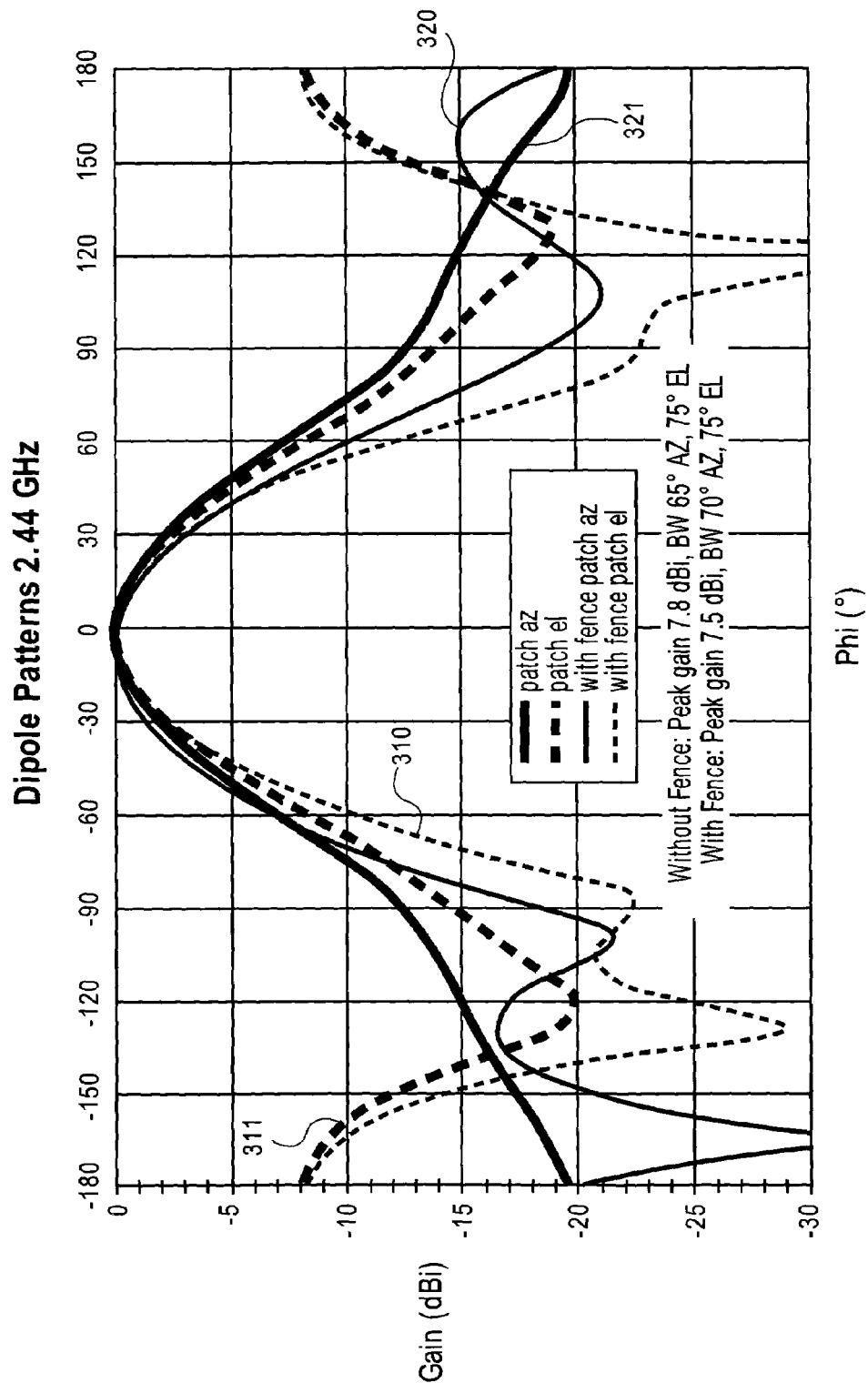
FIG. 3 is a graph illustrating the radiation patterns of a patch portion of an exemplary dipole array configuration with and without an isolation fence in accordance with various exemplary embodiments.

Additional results of the use of the dipole patch array in various embodiments with a selected one of the patch antennae 114 and 115 and the dipole antenna 111 can be seen in FIG. 3, where a radiation plot shows the gain versus angle of azimuth and elevation are shown for a selected one of the patch antennae 114 and 115. In a trace 310, the gain vs. azimuth angle of the selected patch antennae 114 and 115 is shown for an exemplary dipole patch array without the fence 112. Trace 311 shows the gain vs. elevation angle of the selected patch antennae 114 and 115 without the fence 112. A peak gain of 7.8 dBi is realized with an azimuth of 65° and elevation of 70°. When the fence 112 is used, improved roll off at the outer pattern regions is seen. For example, a trace 320 shows the gain vs. azimuth angle of the selected patch antennae 114 and 115 and a trace 321 shows the gain vs. elevation angle of the selected patch antennae 114 and 115 with the fence 112. With the fence 112 in use, a peak gain of 7.5 dBi is realized with an azimuth of 70° and elevation of 75°, however, as noted the roll off in the greater than 90° and less than −90° regions, which regions are most likely to cause interference with the dipole antenna 111, is improved.

Figure 4:
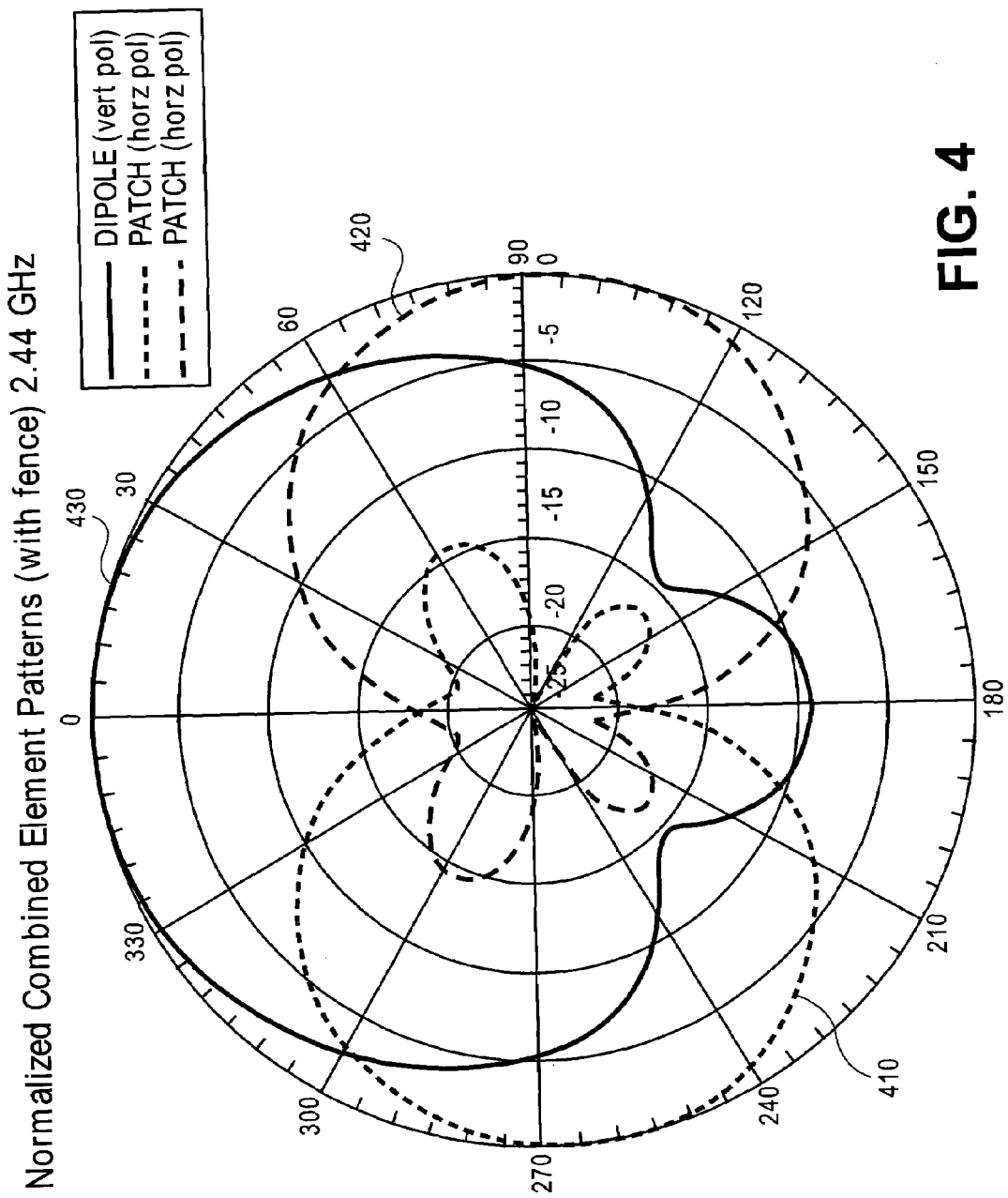
FIG. 4 is a graph illustrating the combined radiation patterns of a dipole portion and patch portions of an exemplary dipole array configuration with an isolation fence in accordance with various exemplary embodiments.
Figure 5:
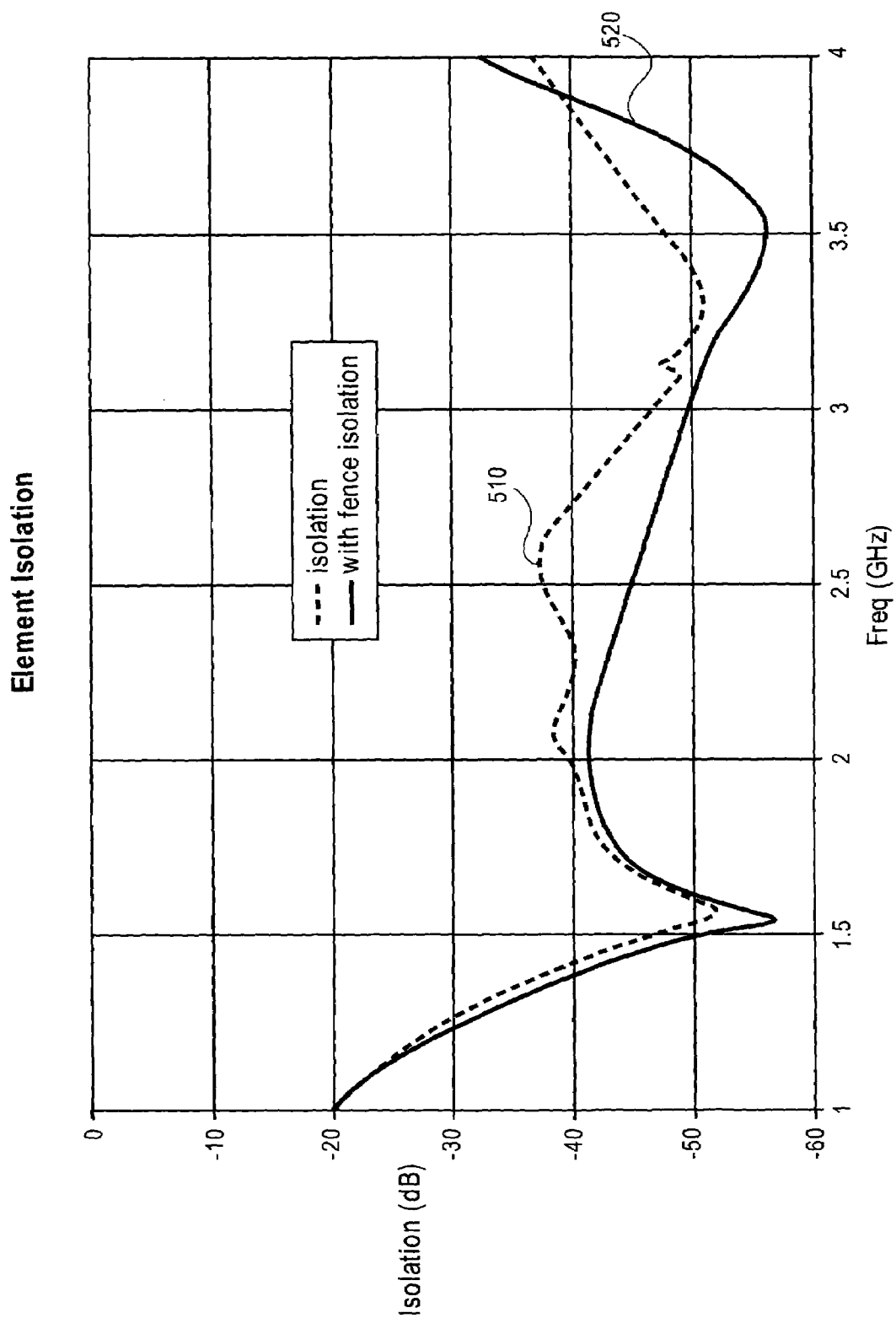
FIG. 5 is a graph illustrating isolation vs. frequency between dipole and patch portions of a dipole array configuration with an isolation fence in accordance with various exemplary embodiments.

The above described performance relations are better seen in the combined plot shown in FIG. 4. Therein, a radiation pattern 430 of the dipole antenna 111 is shown against radiation patterns 410 and 420 of the patch antennae 114 and 115 in an exemplary dipole patch array using a fence 112. As a result of the configuration of the antennae and the use of the fence isolation, particularly at the desired frequency for the present example, such as the 2.44 GHz frequency band commonly associated with the IEEE 802.11(b) specification or the 802.11(g) specification commonly referred to as "Wi-Fi," as shown in FIG. 5. It should be appreciated that the present invention can also be used in other networks or systems such as Wi-Max systems, Wi-Bro systems, and/or systems operating in accordance with well-known IEEE "802" standards such as 802.16 systems and 802.20 systems including their respective subparts, such as 802.16(e) systems, or in any TDD wireless system. A trace 510 shows the isolation between antenna elements vs. frequency for an exemplary dipole patch array without a fence 112. It should be noted that within the 2.44 GHz band, the isolation is locally poor in comparison to a trace 511, which shows isolation with the fence 112 and shows improved isolation in the 2.44 GHz band.

Figure 6:
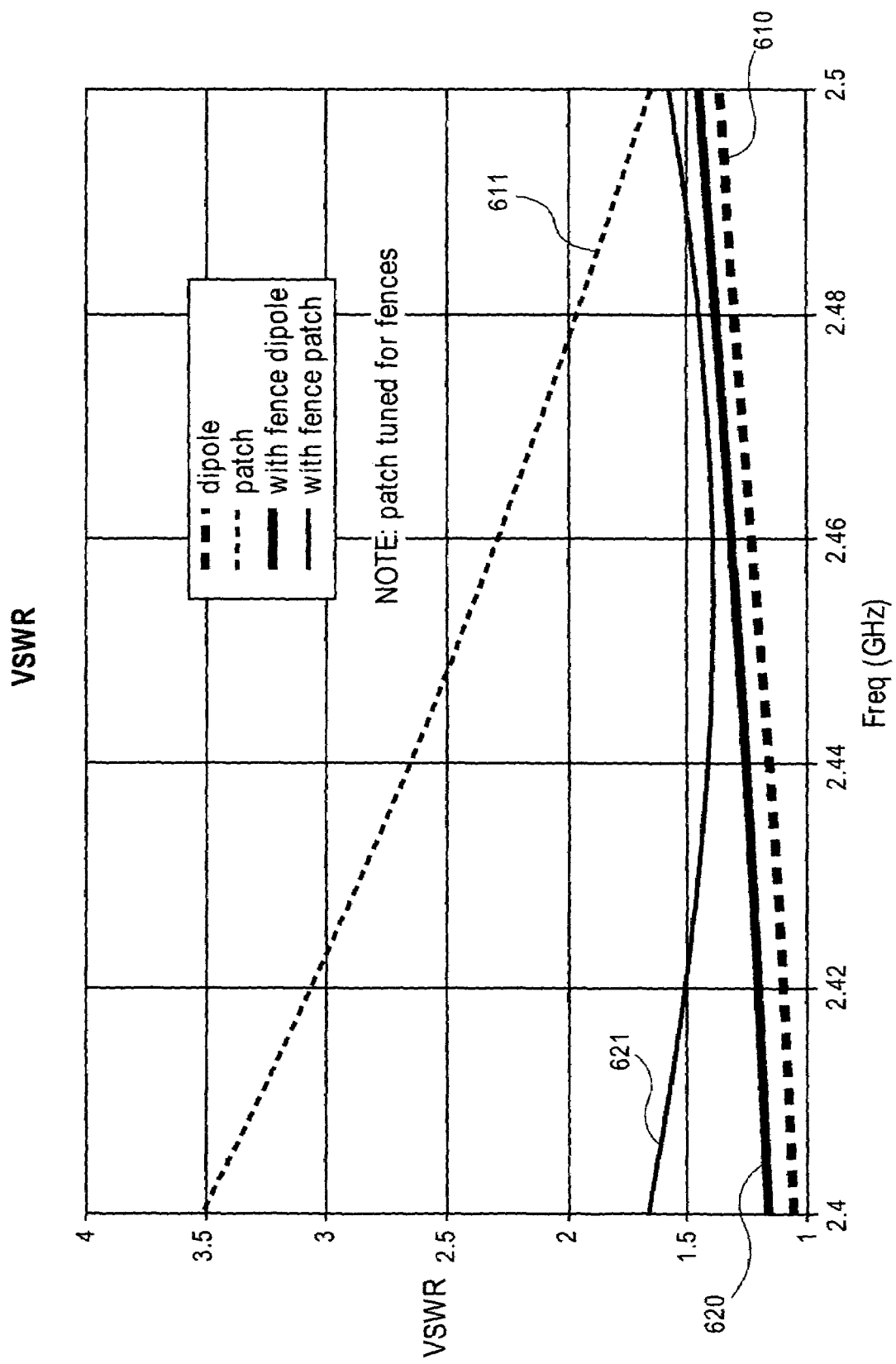
FIG. 6 is a graph illustrating the voltage standing wave ratio (VSWR) for a dipole portion and a patch portion of a dipole array configuration with and without an isolation fence in accordance with various exemplary embodiments.

It will be appreciated that the use of fence 112 can lead to further improvement, for example in the area of antenna matching, particularly for the selected one of the patch antennae 114 and 115 as can be seen in FIG. 6. A trace 610 shows the VSWR vs. frequency for the dipole antenna 111 without the fence 112. It will be noted that the VSWR is relatively flat across the frequency range which is desirable. A trace 611 shows the VSWR vs. frequency for the selected one of the patch antennae 114 and 115 without the fence 112. As can be seen, the VSWR in the desired bandwidth is poor for the selected one of the patch antennae 114 and 115 without the fence 112 indicating mismatching and reduced radiation and reception efficiency. By using the fence 112, only marginal improvement in VSWR is realized for the dipole antenna 111 as shown in a trace 620. However, with the use of the fence 112, VSWR performance is drastically improved for the selected one of the patch antennae 114 and 115 as shown in a trace 621.

Figure 7:
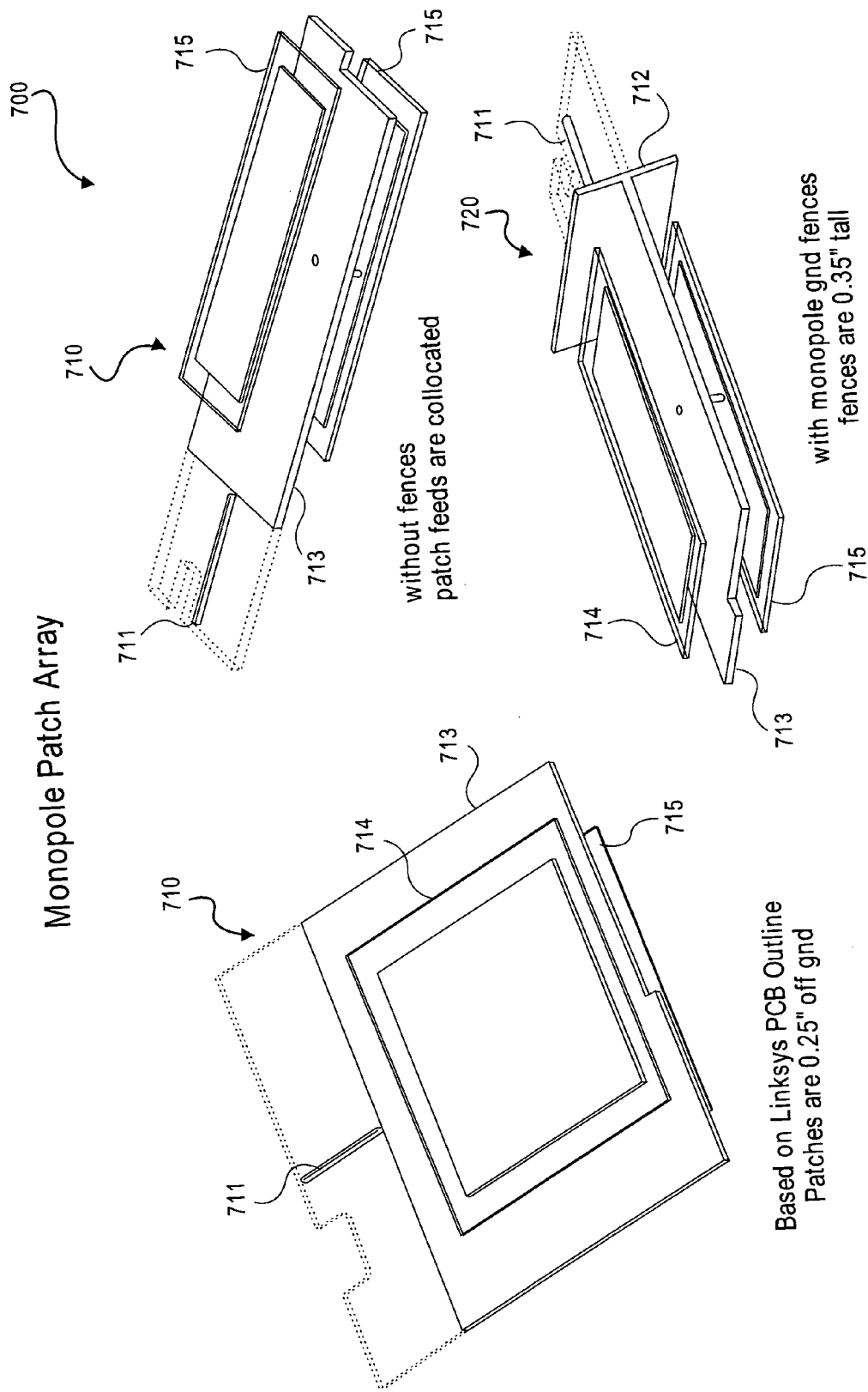
FIG. 7 is a diagram illustrating monopole array configurations in accordance with various exemplary embodiments.

In accordance with various alternative embodiments, as noted above, the exemplary repeater can be configured as a monopole patch array 700 as shown in FIG. 7. As with the dipole configuration, a pair of parallel patch antennae 714 and 715 can be arranged on either side of a ground plane 713, which can also be used as the circuit board for the repeater circuitry. Each of the patch antennae 714 and 715 are arranged in parallel with the ground plane 713 and can be printed on a printed circuit board (PCB), wiring board or the like, or can be constructed of a stamped metal portion embedded in a plastic housing. A planar portion of the PCB associated with the ground plane 713 can contain an antenna, such as a monopole antenna 711 configured, for example, as an embedded trace thereon and directed toward the client side of the repeater. It will be appreciated that the orientation of the patch antennae 714 and 715 are orthogonal with respect to the monopole antenna 711 and thus are orthogonally polarized leading to greater isolation and link efficiency. Typically, the patch antennae 714 and 715 are vertically polarized and the monopole antenna 711 is horizontally polarized.

An isolation fence 712 can be used to provide an electromagnetic barrier between the physical regions of the patch antennae 714 and 715 and the monopole antenna 711 which are most likely to couple into each other. The isolation fence can be electrically coupled to the ground plane 713 to further enhance common mode noise rejection.

Figure 8:
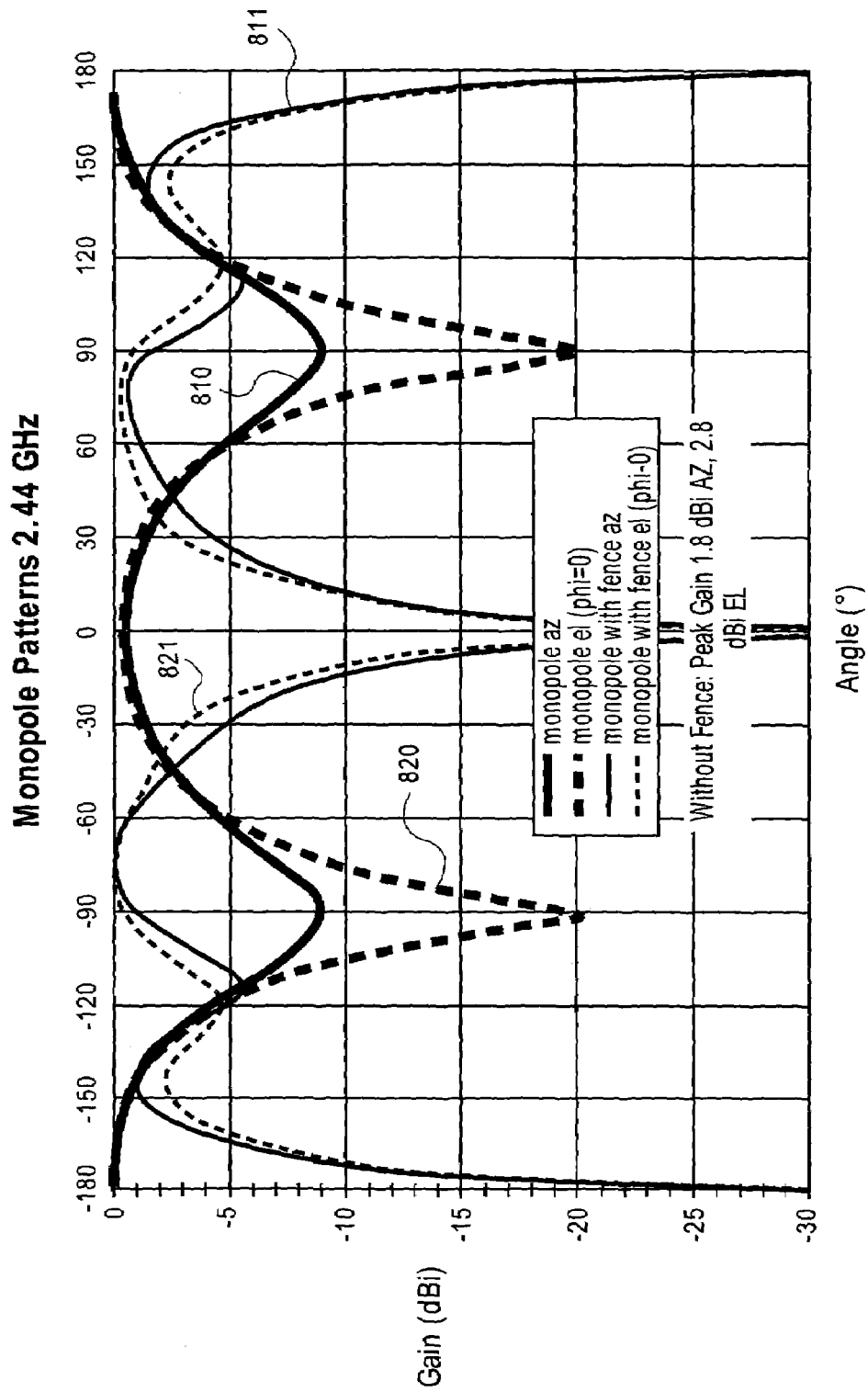
FIG. 8 is a graph illustrating the radiation patterns of a monopole portion of an exemplary monopole array configuration with and without an isolation fence in accordance with various exemplary embodiments.

The result of the use of the monopole patch array in various embodiments with a selected one of the patch antennae 714 and 715 and the monopole antenna 711 can be seen in FIG. 8, where a radiation plot shows the gain versus angle of azimuth and elevation are shown for the monopole antenna 711. In a trace 810, the gain vs. azimuth angle of the monopole antenna 711 is shown for an exemplary monopole patch array without the fence 712. Trace 811 shows the gain vs. elevation angle of the monopole antenna 711 without the fence 712. When the fence 712 is used, an improvement in localized directivity can be seen. For example, a trace 820 shows the gain vs. azimuth angle of the monopole antenna 711 and a trace 821 shows the gain vs. elevation angle of the monopole antenna 711 with the fence 712. With the fence 712 in use, a peak azimuthal gain of 1.8 dBi is realized an a peak elevation gain of 2.8 dBi is realized.

Figure 9:
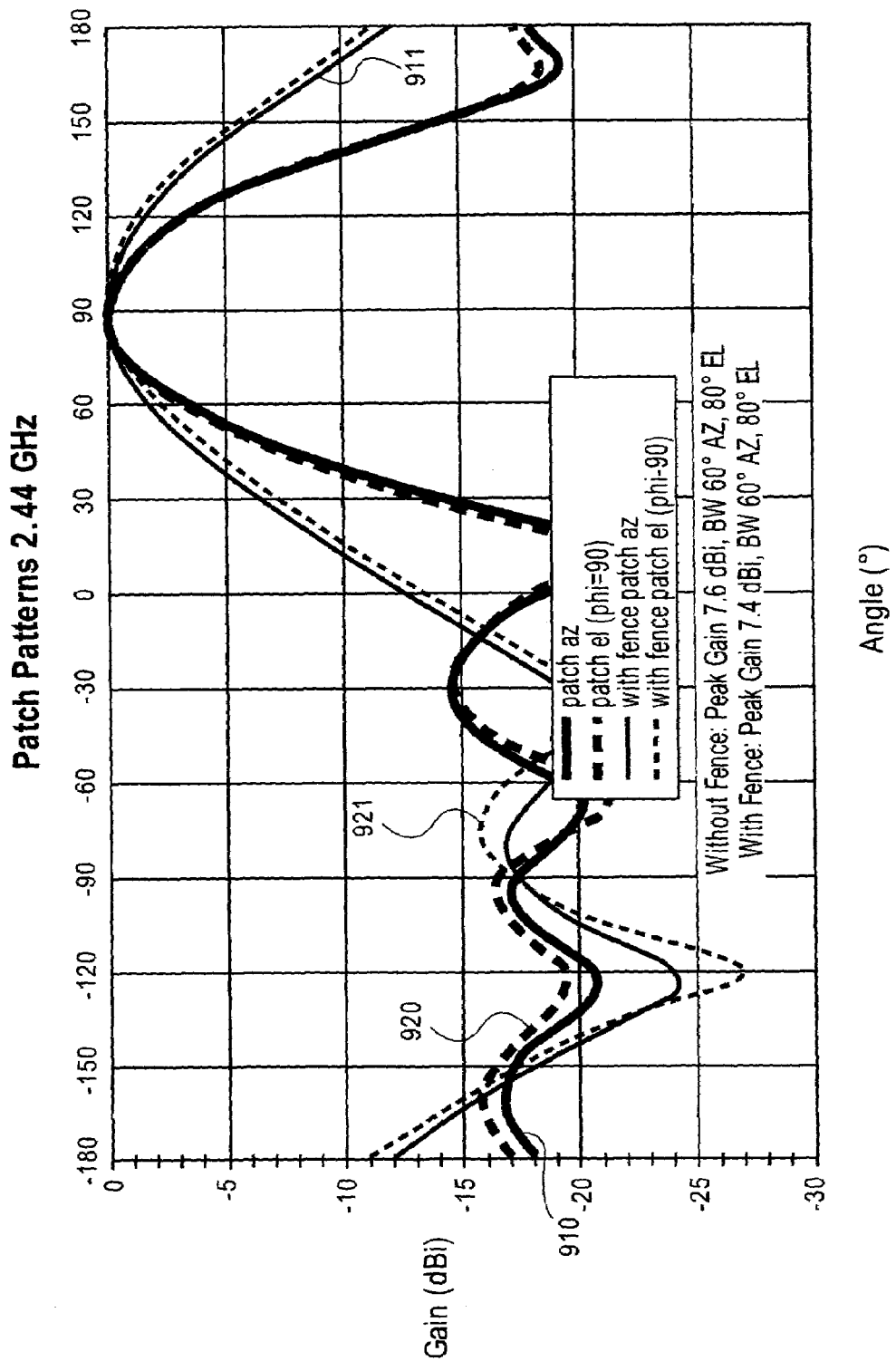
FIG. 9 is a graph illustrating the radiation patterns of a patch portion of an exemplary monopole array configuration with and without an isolation fence in accordance with various exemplary embodiments.
Figure 10:
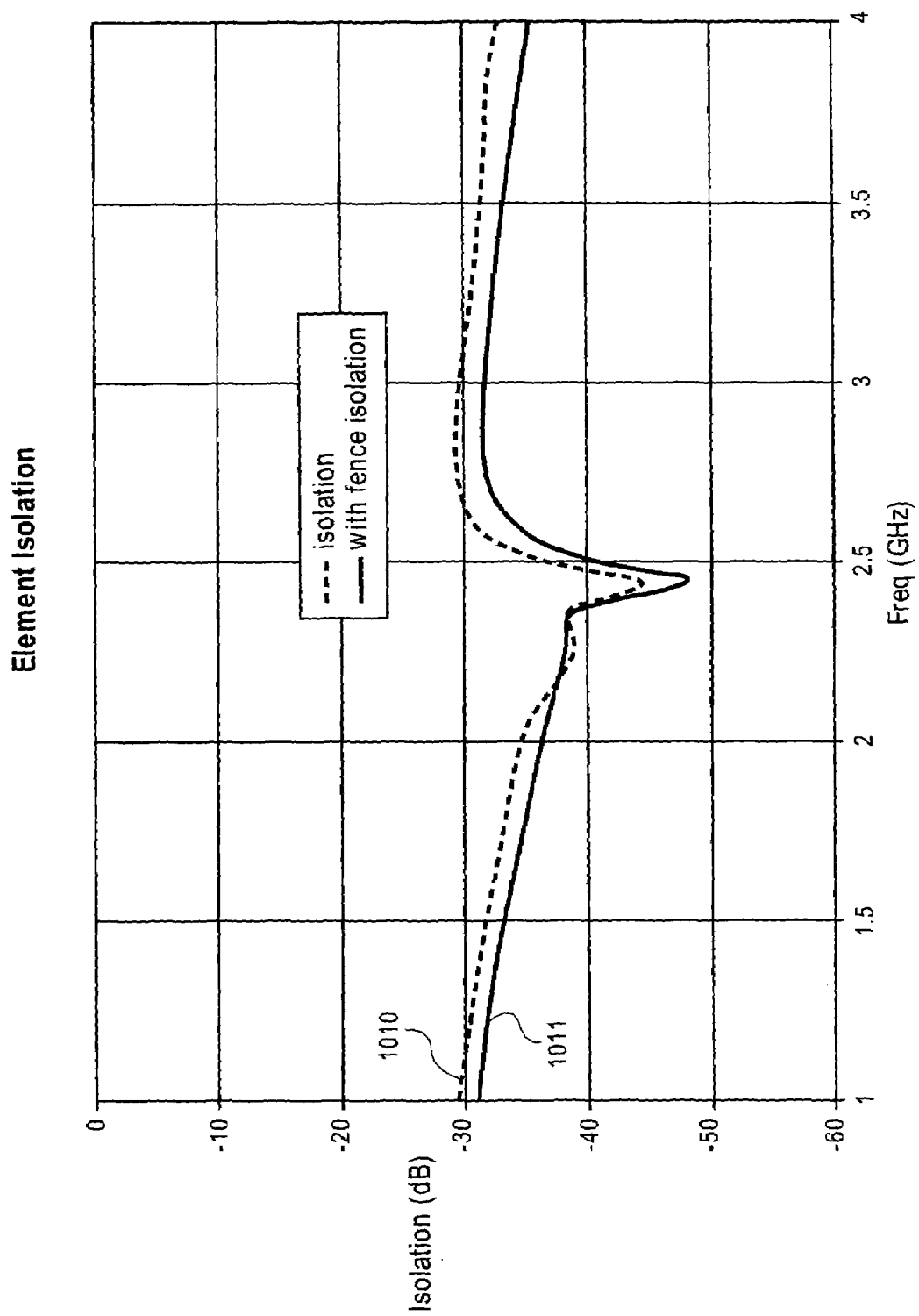
FIG. 10 is a graph illustrating isolation vs. frequency between monopole and patch portions of a monopole array configuration with an isolation fence in accordance with various exemplary embodiments.

Additional results of the use of the monopole patch array in various embodiments with a selected one of the patch antennae 714 and 715 and the monopole antenna 711 can be seen in FIG. 9, where a radiation plot shows the gain versus angle of azimuth and elevation are shown for a selected one of the patch antennae 714 and 715. In a trace 910, the gain vs. azimuth angle of the selected patch antennae 714 and 715 is shown for an exemplary monopole patch array without the fence 712. Trace 911 shows the gain vs. elevation angle of the selected patch antennae 714 and 715 without the fence 712. A peak gain of 7.6 dBi is realized with an azimuth of 60° and elevation of 80°. When the fence 712 is used, some change in roll off at the outer pattern regions is seen however performance closely matches non-fence performance. For example, a trace 920 shows the gain vs. azimuth angle of the selected patch antennae 714 and 715 and a trace 921 shows the gain vs. elevation angle of the selected patch antennae 714 and 715 with the fence 712. With the fence 712 in use, a peak gain of 7.4 dBi is realized with an azimuth of 60° and elevation of 80°, which is nearly identical to the performance without the fence. Likewise, isolation with the use of the fence shows nominal improvement as shown in FIG. 10. A trace 1010 shows the isolation between antenna elements vs. frequency for an exemplary monopole patch array without a fence 712. In comparison to a trace 1011, which shows isolation with the fence 712, a small margin of improved isolation is realized.

Figure 11:
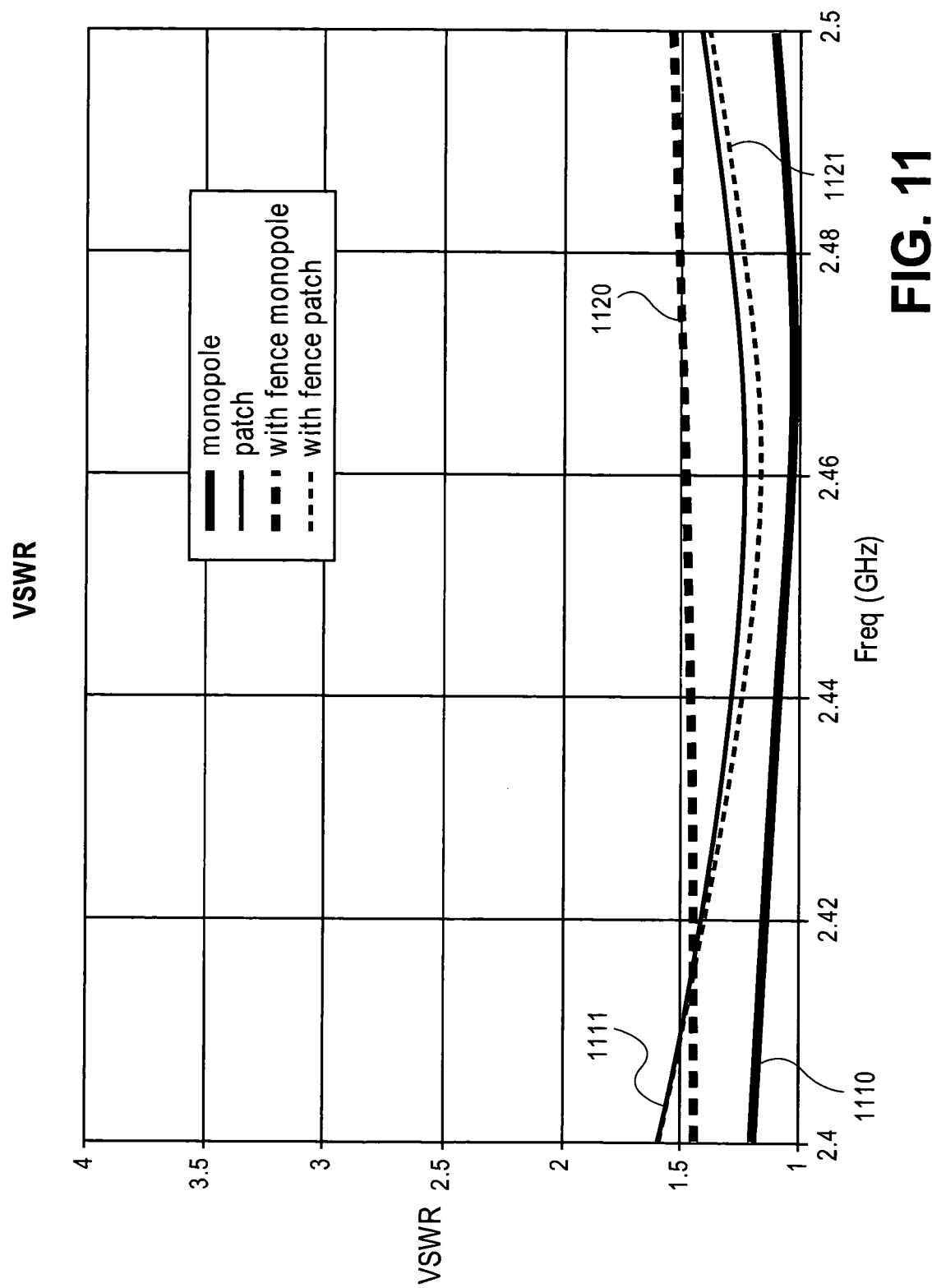
FIG. 11 is a graph illustrating the voltage standing wave ratio (VSWR) for a monopole portion and a patch portion of a monopole array configuration with and without an isolation fence in accordance with various exemplary embodiments.

Use of fence 712 leads to only marginal improvement in VSWR for the selected one of the patch antennae 714 and 715 as can be seen in FIG. 11, while actually decreasing the VSWR performance slightly for the monopole antenna 711. A trace 1110 shows the VSWR vs. frequency for the monopole antenna 711 without the fence 712. It will be noted that the VSWR is relatively flat across the frequency range which is desirable. A trace 1111 shows the VSWR vs. frequency for the selected one of the patch antennae 714 and 715 without the fence 712. As can be seen, the VSWR is relatively flat across the frequency range which is desirable. By using the fence 712, a marginal degradation in VSWR is realized for the monopole antenna 711 as shown in a trace 1120. With the use of the fence 712, VSWR performance is only nominally improved for the selected one of the patch antennae 714 and 715 as shown in a trace 1121.

Figure 12A:
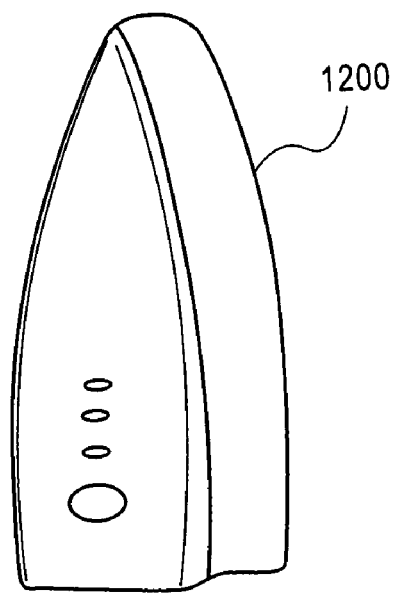
FIG. 12A is a diagram illustrating an enclosure for an antennae array configuration in accordance with various exemplary embodiments including a dipole array configuration.
Figure 12B:
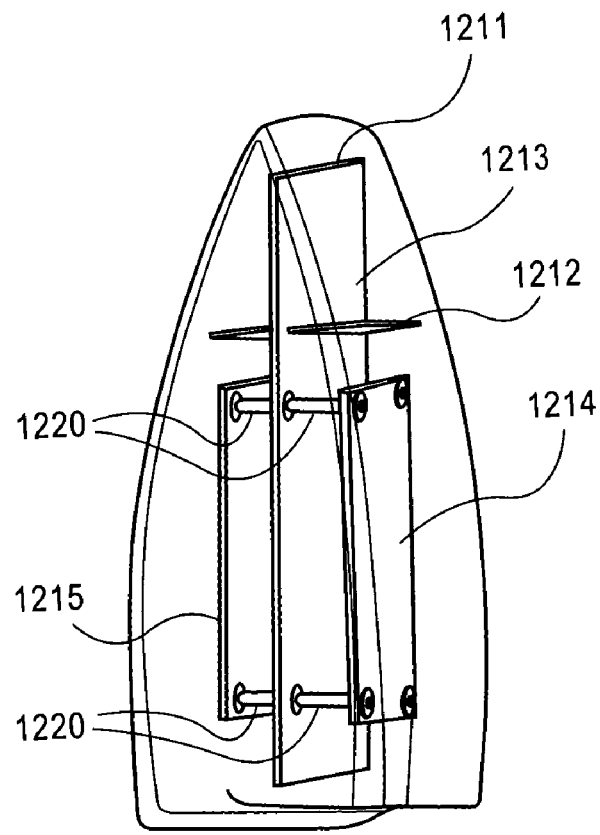
FIG. 12B is a diagram illustrating an internal view of the enclosure of 12A in accordance with various exemplary embodiments.
Figure 13A:
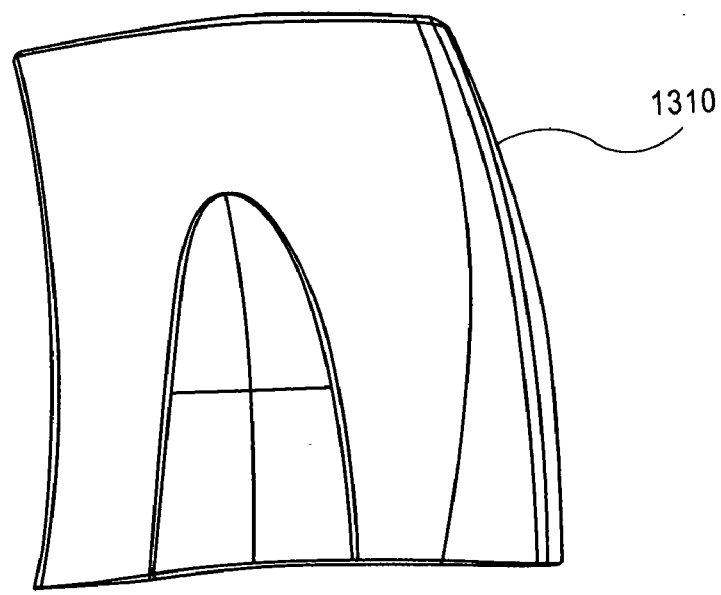
FIG. 13A is a diagram illustrating an alternative enclosure for an antennae array configuration in accordance with various exemplary embodiments.
Figure 13B:
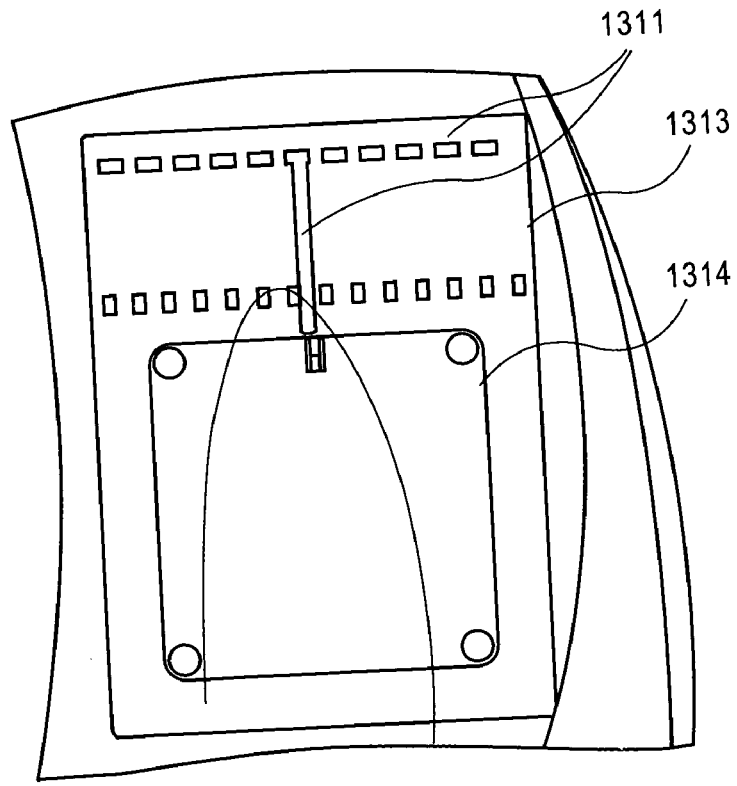
FIG. 13B is a diagram illustrating an internal view of the enclosure of 13A in accordance with various exemplary embodiments.

It will be appreciated that the exemplary dipole or monopole patch array along with the repeater electronics can be efficiently housed in a compact enclosure 1200 as shown in FIG. 12A. The structure of the enclosure 1200 can be such that it will be naturally oriented in one of two ways however, instructions can guide a used in how to place the enclosure to maximize signal reception. An exemplary dipole patch array is shown in FIG. 12B, where a ground plane 1213, preferably incorporated with a PCB for the repeater electronics can be arranged in parallel between two patch antennae 1214 and 1215 using, for example, standoffs 1220. It will be appreciated that in some embodiments, in order to reduce costs, standoffs will be unnecessary as the enclosure 1200 can be molded with slots or other fixative structures to hold the ground plane 1213 and the two patch antennae 1214 and 1215 in position when the enclosure 1200 is assembled. An isolation fence 1212 can be used as noted above to improve isolation in many instances. In alternative embodiments as shown in FIG. 13A and FIG. 13B, a claimshell enclosure 1310 can be used with a ground plane/PCB substrate 1313 positioned therewithin and a patch antenna 1314 and client side antenna 1311, which can be a dipole antenna, a monopole antenna or the like, for example, as described hereinabove.

Figure 14:
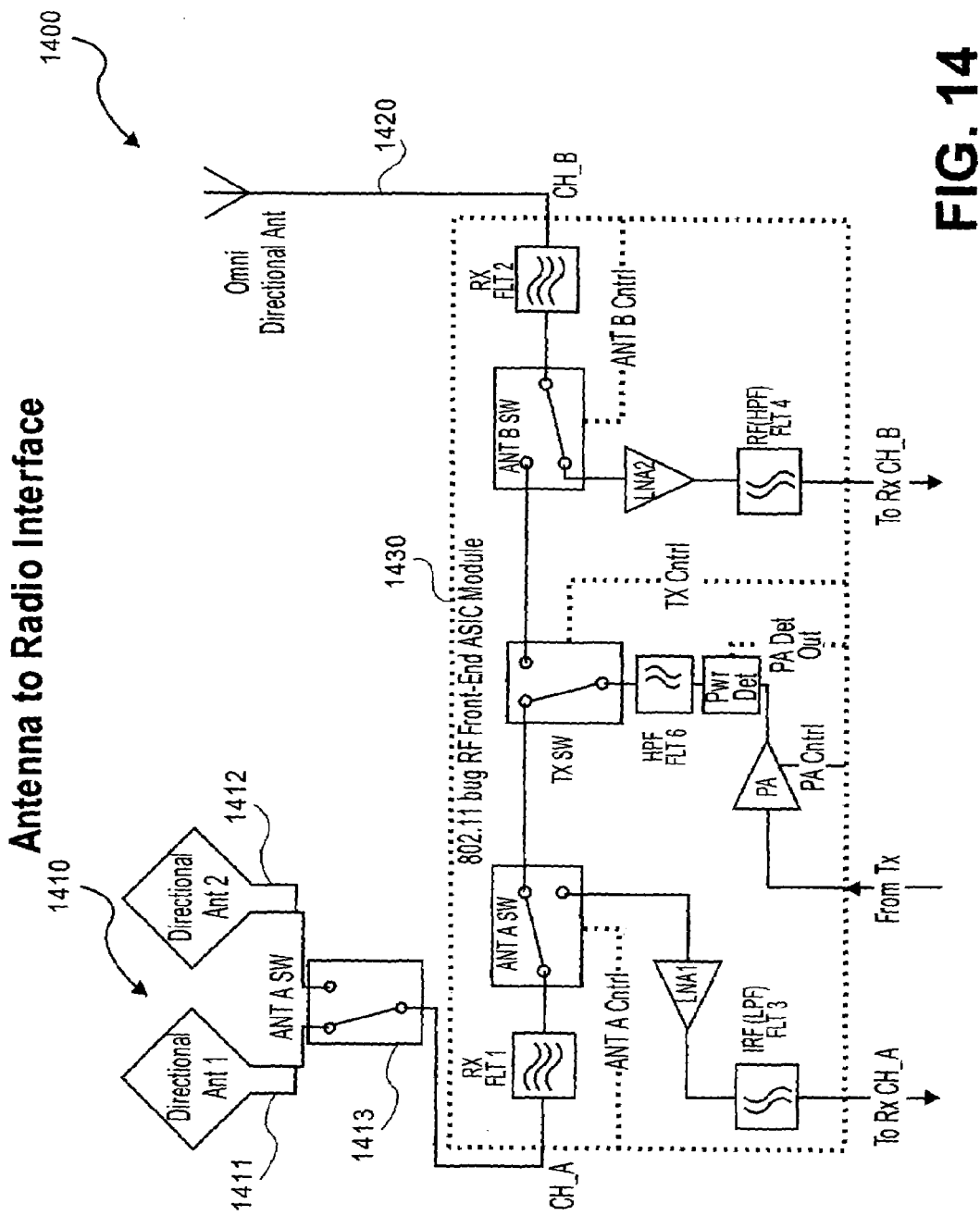
FIG. 14 is a diagram illustrating switching unit for switching between directional antennae in accordance with various exemplary embodiments.

As described above, the directional antenna includes two or more antennae such as patch antennae which can be switched as illustrated in exemplary scenario 1400 as shown in FIG. 14. An exemplary repeater unit can include a directional antenna section 1410, an omni directional or quasi omni directional antenna section 1420 and a radio frequency (RF) front end section 1430 some or all of which can be integrated into, for example, an integrated antenna array. The directional antenna section 1410 includes a first directional antenna 1411, a second directional antenna 1412, and possibly additional antenna which can include patch portions etched into a printed circuit board material or can be stamped from metal and laminated as described hereinabove. The first directional antenna 1411 and the second directional antenna 1412 or additional antenna can be switched into operation using an antenna switch 1413 depending on which of the directional antenna have the best signal characteristics. In a set up procedure, which can be performed by a user, the repeater is positioned near the desired base station or AP and a button is pressed. Input is provided to the repeater that will allow it to be configured according to a button press procedure such as that described in pending application U.S. patent application Ser. No. 10/536,471, entitled "IMPROVED WIRELESS NETWORK REPEATER," filed May 26, 2005, attorney docket no. WF02-09/27-007 and incorporated herein by reference. The integrated antenna array can be housed in a compact housing, for example as described hereinabove in connection with FIG. 12.

Accordingly, the exemplary repeater can select the first directional antenna 1411 and scans all allowable frequency channels for beacon transmissions from an AP. The repeater stores each received beacon and information about the quality of the signal associated with the beacon in a table. The repeater then selects the second directional antenna 1412 and repeats the scan of the allowable frequency channels as noted above. If additional directional antennae are used, then the repeater will scan and record beacon signal information for all the directional antennae and store the information in a table. When scanning is compete for all the directional antennae, the directional antenna associated with the beacon signal information having the best quality metric such as power, signal-to-noise-ration (SNR) or the like between the two antennae will be selected and identified as the master or target AP and an identifier such as a BSS_ID, which is typically the MAC address of the target AP, is stored. The identifier can then be provided to the repeater showing the "affiliated" AP for reference during subsequent start ups. Once the affiliated AP information, such as the BSS_ID for the affiliated AP, is stored and the scanning task is indicated as being complete, the user will re-position the repeater.

Once the repeater is relocated and powered, the above described scan process or a modified scan process can be repeated. However, once information associate with the affiliated AP is obtained in a first scan or a first portion of a scanning procedure, it can be used in making the decision as to which patch antenna is deemed to have the best signal quality and therefore is selected as the patch for initial operation. It will further be appreciated that in some embodiments, a combined scan procedure that locates APs and selects a best signal patch antenna can be used in one initialization procedure. When initialization is complete, a "configured" indication is provided to a user such as a simple LED indicator (not shown).

Additional scanning can be performed based on various scan criteria. For example, additional scans can be performed periodically after the expiration of a time interval, when a quality metric, including a received power level of the AP signal, drops below a threshold, when the packet error rate exceeds a threshold value, or when various other criteria are met. Additional scanning can also be performed opportunistically during periods where no important information is or will be transmitted over the repeater link based, for example, on known characteristics of the wireless MAC protocol.

Figure 15:
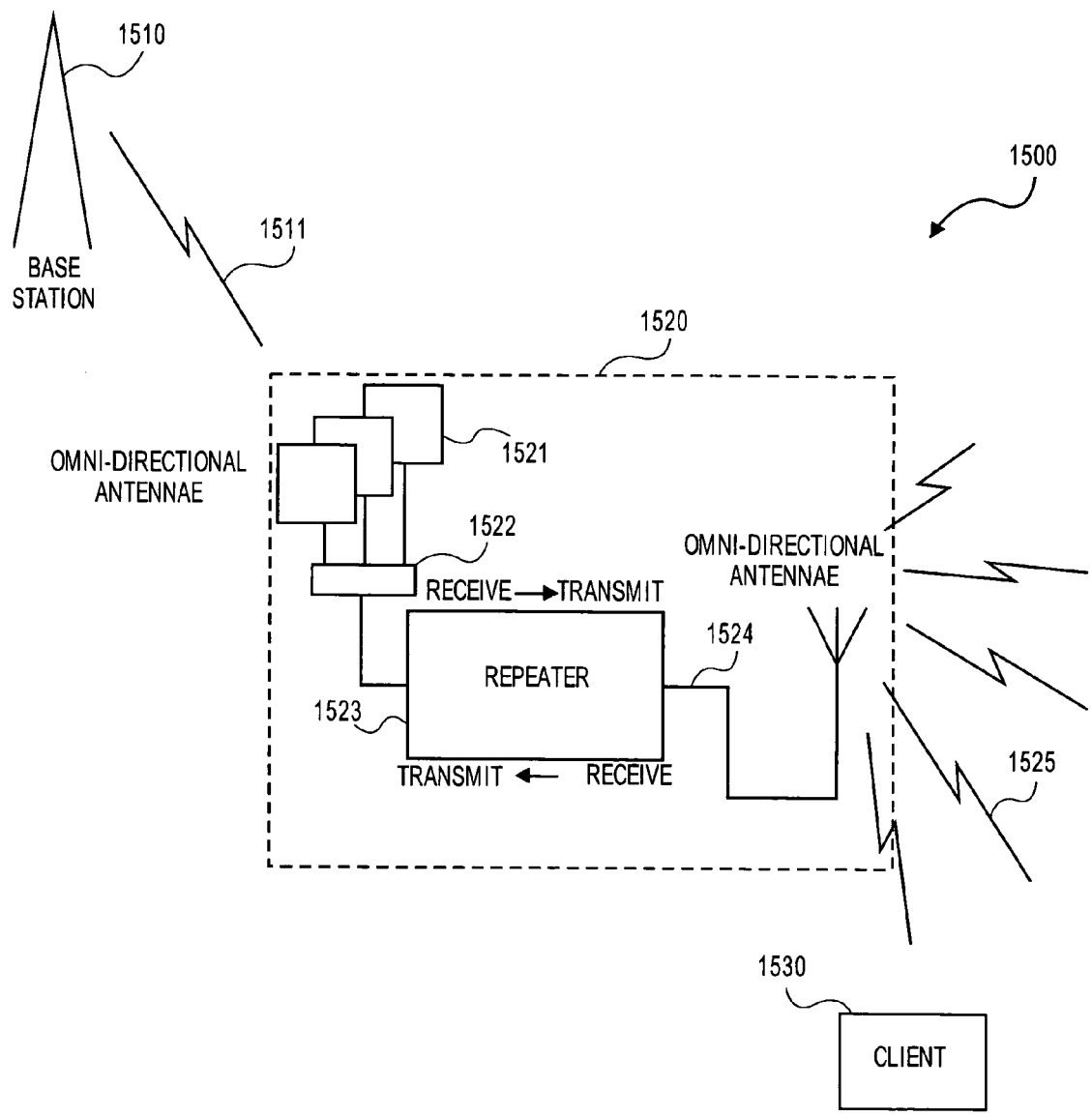
FIG. 15 is a diagram illustrating a repeater in a system with a client and an access point in accordance with various exemplary embodiments.

To illustrate the placement of an exemplary repeater in a wireless TDD system, an exemplary wireless network scenario 1500 is shown in FIG. 15. Therein a base station 1510 can communicate with a repeater 1520 for communication with a client 1530. An air interface 1511 can be used for communication to and from the base station 1510 and the repeater 1520 through one or more directional antennae 1521 one of which can be selected for optimum operation using switch 1522. The selection of the antennae 1521 can be changed in accordance with a periodic scanning interval or a scanning performed based on additional criteria as described hereinabove. A repeater unit 1523 is capable of simultaneously handing transmission and reception of information to and from the base station 1510 while communicating with the client 1530 using a directional antenna 1524, which broadcasts the repeated signal to client 1530 over air interface 1525 and also receives signal energy from client 1530 to re-transmit to base station 1510. It will also be appreciated that depending on the particular embodiment, the repeater 1523 can act as a physical (PHY) layer repeater simply re-transmitting without parsing the protocol information such as the packet header or the like, or can be provided with additional intelligence such that the repeater 1523 can provide additional higher layer protocol functions, such as media access control (MAC) functions which require header parsing, error correction, routing, and the like typically associated with a higher layer protocol.

In accordance with some embodiments, multiple antenna modules can be constructed within the same repeater or device, such as multiple directional antennae or antenna pairs as described above and multiple omni or quasi-omni-directional antennae for use, for example, in a multiple-input-multiple-output (MIMO) environment or system.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention. The various circuits described above can be implemented in discrete circuits or integrated circuits, as desired by implementation. Further, portions of the invention may be implemented in software or the like as will be appreciated by one of skill in the art and can be embodied as methods associated with the content described herein.

What is claimed is:

1. A wireless communication node in a wireless communication system, the wireless communication node having a receiver portion and a transmitter portion for simultaneously receiving and transmitting, the receiver portion and the transmitter portion tuning over a range of overlapping frequencies, the wireless communication node comprising:

a substantially omni-directional antenna coupled to the receiver portion and the transmitter portion, the substantially omni-directional antenna configured to transmit using the transmitter portion during a first interval; and a pair of directional antennae coupled to the receiver portion and the transmitter portion, the pair of directional antennae configured to simultaneously receive using the receiver portion while transmitting with the substantially omni-directional antenna using the transmitter portion during the first interval, wherein the substantially omni-directional antenna is further configured to receive using the receiver portion during a second interval and the pair of directional antennae is further configured to simultaneously transmit using the transmitter portion while receiving with the substantially omni-directional antenna using the receiver portion during the second interval.

2. A wireless communication node according to claim 1, wherein at least one of the pair of directional antennae is configured to be used with a different one of the overlapping frequencies than a one of the overlapping frequencies associated with the substantially omni-directional antenna.

3. A wireless communication node according to claim 1, wherein the pair of directional antennae is associated with a wireless base station and the substantially omni-directional antenna is associated with a wireless client.

4. A wireless communication node according to claim 1, wherein the wireless communication system includes a Wi-Fi system, and the wireless communication node includes a Wi-Fi repeater configured to repeat a signal from a Wi-Fi base station to a Wi-Fi client and from the Wi-Fi client to the base station.

5. A wireless communication node according to claim 1, wherein the wireless communication node includes a physical layer (PHY) repeater.

6. A wireless communication node according to claim 1, wherein the wireless communication node includes a repeater configured to:

repeat a signal from a base station to a client using one of the transmitter portion and the receiver portion during one of the first interval and the second interval, and from the client to the base station using an other of the transmitter portion and the receiver portion during an other of the first interval and the second interval;

generate packets associated with the repeated signal; and perform a media access control (MAC) layer address operation on one or more of the generated packets.

7. A frequency translating repeater having a receiver and a transmitter for simultaneously receiving and transmitting, the repeater comprising:

a substantially omni-directional antenna coupled to the receiver and the transmitter, the transmitter configured to transmit using the substantially omni-directional antenna during a first repeating interval; and a pair of directional patch antennae coupled to the receiver and the transmitter, the receiver configured to simultaneously receive using the pair of directional patch antennae while transmitting during the first repeating interval, wherein the receiver is further configured to receive using the substantially omni-directional antenna during a second repeating interval, and the transmitter is further configured to simultaneously transmit using the pair of directional patch antennae while receiving during the second repeating interval.

8. A frequency translating repeater according to claim 7, wherein the substantially omni-directional antenna is configured to operate on a different frequency from a frequency associated with the pair of directional patch antennae.

9. A frequency translating repeater according to claim 7, further comprising an antenna switch configured to select one of the pair of directional patch antennae for use during the first repeating interval.

10. A frequency translating repeater according to claim 7, further comprising an antenna switch configured to select one of the pair of directional patch antennae for use during the first repeating interval, the selection of the one of the pair of directional patch antennae based on a quality metric associated with a transmission received during an initial configuration interval.

11. A frequency translating repeater according to claim 7, further comprising an antenna switch configured to select one of the pair of directional patch antennae for use during the first repeating interval, the selection of the one of the pair of directional patch antennae based on a quality metric associated with a transmission received during a periodic evaluation interval.

12. A frequency translating repeater according to claim 7, further comprising an antenna switch and a processor, the antenna switch configured to select one of the pair of directional patch antennae for use during the first repeating interval, the selection based on a criteria evaluated using the processor.

13. A frequency translating repeater according to claim 7, including a physical layer (PHY) repeater.

14. A frequency translating repeater according to claim 7, configured to:
repeat a signal from a base station to a client during one of the first repeating interval and the second repeating interval, and from the client to the base station during an other of the first repeating interval and the second repeating interval;
generate packets associated with the repeated signal; and
perform a media access control (MAC) layer addressing operation on one or more of the generated packets.

15. A frequency translating repeater according to claim 7, wherein the repeater, the substantially omni-directional antenna and the pair of directional patch antennae are integrated into an array unit and are enclosed together in a compact housing.

16. A frequency translating repeater according to claim 7, further comprising an electrical plug plugging into an electrical socket, wherein the repeater, the substantially omni-directional antenna, the pair of directional patch antennae and the electrical plug are integrated into an array unit and are enclosed together in a compact housing.

17. A frequency translating repeater according to claim 7, wherein the repeater, the substantially omni-directional antenna and the pair of directional patch antennae are integrated into an array unit and are enclosed together in a compact housing, the compact housing configured for placement on a working surface and for orientation for minimal interaction with a nearby surface other than the work surface.

18. An integrated antenna array in a wireless communication node, the integrated antenna array comprising:
a substrate having a first end portion and a second end portion and side portions opposite each other, the substrate including a ground plane and circuitry associated with the wireless communication node;
a first patch antenna element located over a first one of the side portions of the substrate on the first end thereof;
a second patch antenna element located over a second one of the side portions of the substrate on the first end thereof, the first and second patch antenna elements having the same polarization;
a substantially omni-directional antenna element located on the second end of the substrate apart from the first end, the substantially omni-directional antenna element having a polarization orthogonal to the polarization of the first and the second patch antenna elements.

19. An integrated antenna array according to claim 18, further comprising a conductive barrier coupled to the substrate between the first end and the second end, the conductive barrier modifying a pattern of at least one of the first and the second patch antenna elements and the substantially omni-directional antenna element so as to increase isolation between the first and the second patch antenna elements and the substantially omni-directional antenna element.

20. An integrated antenna array according to claim 18, wherein the first and the second patch antenna elements are constructed from printed circuit board (PCB) material.

21. An integrated antenna array according to claim 18, wherein the first and the second patch antenna elements are constructed from one of stamped metal and cut metal.

22. An integrated antenna array according to claim 18, wherein the wireless communication node is configured to operate in one of a Wi-Max system, a Wi-Bro system, an 802.16 system, an 802.20 system, a TDD wireless system.

23. An integrated antenna array according to claim 18, further comprising a receiver portion and a transmitter portion, wherein the first and the second patch antenna elements and the substantially omni-directional antenna element are coupled to the receiver portion and the transmitter portion and wherein the transmitter portion and the receiver portion are configured to independently transmit and receive respectively on any of the first and the second patch antenna elements and the substantially omni-directional antenna element.

24. An integrated antenna array according to claim 18, wherein the wireless communication node is located in a multiple-input-multiple-output (MIMO)-based access point (AP).

25. An integrated antenna array according to claim 18, wherein the wireless communication node is located in a multiple-input-multiple-output (MIMO)-based client.

26. An integrated antenna array according to claim 18, further comprising multiple ones of the first and the second patch antenna elements and the substantially omni-directional antenna element for operation in a multiple-input-multiple-output (MIMO)-based system.

* * * * *